United States Patent [19]

Hyldal

[11] Patent Number: 4,656,376

[45] Date of Patent: Apr. 7, 1987

[54] MOTOR-COMPRESSOR UNIT WITH OFFSET STARTING TORQUE

[75] Inventor: Jørgen Hyldal, Nordborg, Denmark

[73] Assignee: Danfoss A/S, Nordborg, Denmark

[21] Appl. No.: 869,215

[22] Filed: Jun. 2, 1986

[30] Foreign Application Priority Data

Jun. 15, 1985 [DE] Fed. Rep. of Germany ....... 3521526

[51] Int. Cl.$^4$ ............................................. H02P 6/02
[52] U.S. Cl. ........................................ 310/41; 310/20; 318/254; 417/415
[58] Field of Search .................. 310/41, 49, 68, 80; 318/254, 439; 417/325, 415

[56] References Cited

U.S. PATENT DOCUMENTS

| | | | |
|---|---|---|---|
| 4,065,706 | 12/1977 | Gosling et al. | 318/254 |
| 4,251,758 | 2/1981 | Pedersen et al. | 318/254 |
| 4,270,076 | 5/1981 | Nygaard | 318/254 |
| 4,401,419 | 8/1983 | Rabe | 318/254 |
| 4,600,864 | 7/1986 | Sato | 318/254 |

Primary Examiner—Patrick R. Salce
Assistant Examiner—D. L. Rebsch
Attorney, Agent, or Firm—Wayne B. Easton

[57] ABSTRACT

A motor-compressor unit of the type in which a compressor piston is driveable by the eccentric of a motor shaft of a two pole D.C. motor. The starting characteristics of the unit are improved by off-setting phase-wise the torque developed by the motor from the torque required to drive the compressor.

5 Claims, 6 Drawing Figures

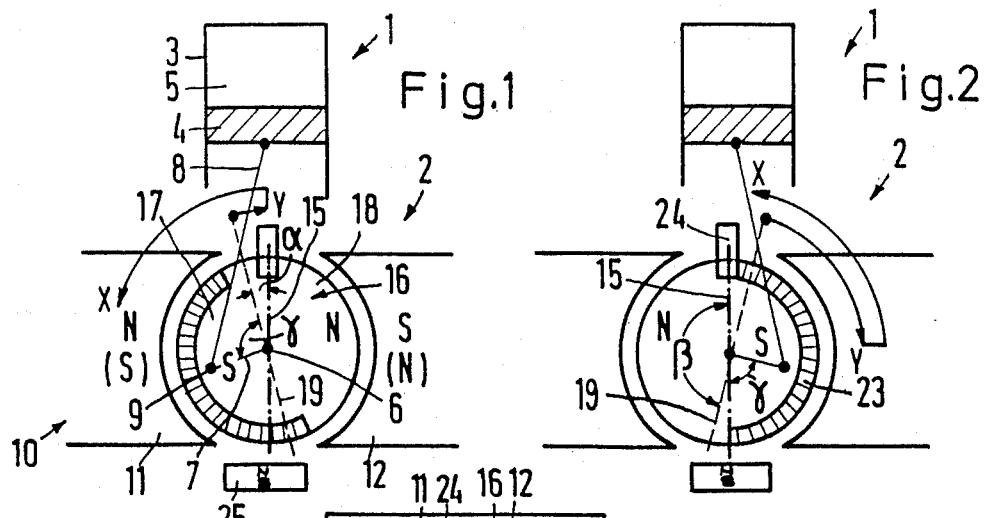
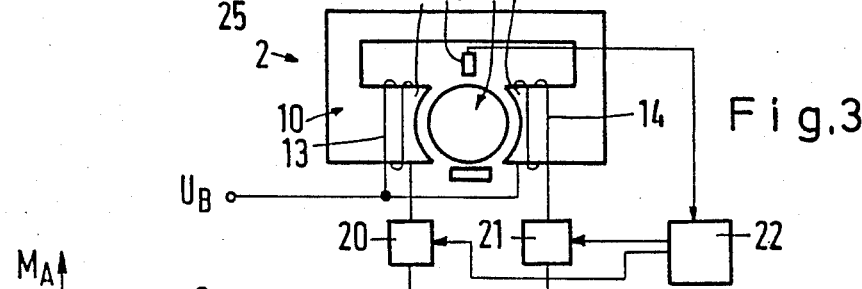
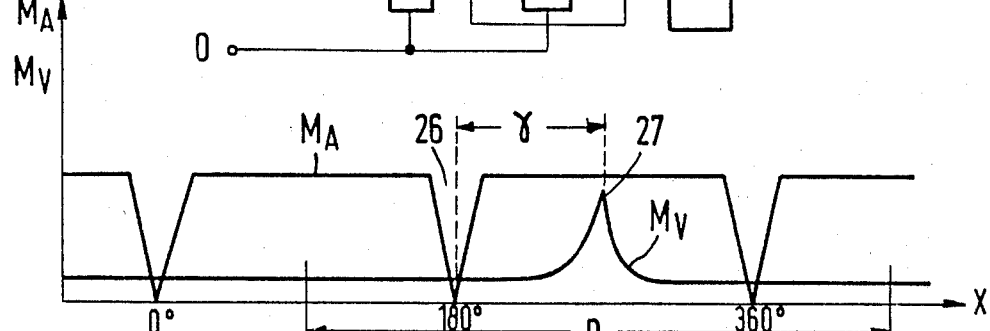
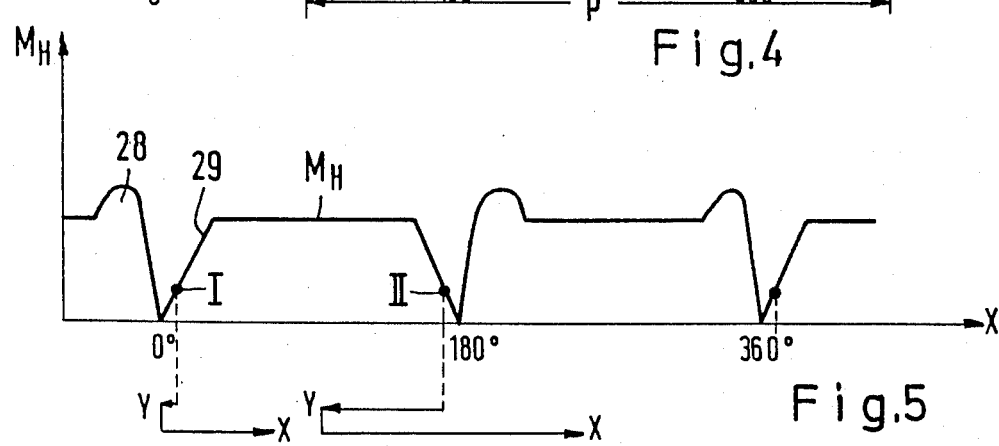

MOTOR-COMPRESSOR UNIT WITH OFFSET STARTING TORQUE

The invention relates to a motor-compressor unit in which a compressor piston movable in a cylinder is drivable by the eccentric of a motor shaft, a two-pole D.C. motor has a rotor and stator of which one has permanently magnetic poles and the other has poles which are excitable by at least one winding and of which the polarity is changeable by electronic switching elements, and a control circuit brings about the change during operation in response to the angular position of the rotor.

In a known motor-compressor unit of this kind marketed by the assignee hereof, the motor and the control circuit are constructed in accordance with U.S. Pat. No. 4,251,758. The rotor carries the permanently magnetic poles. Between the stator poles, there is a stationary permanent magnet pole for fixing two defined rest positions which are offset from each other by less than 180°. In a first part of the starting phase, the control circuit gives the excitable poles a predetermined polarity during a predetermined over-control period, irrespective of the rotory position of the rotor, so that the rotor initially starts up against the direction of rotation during operation. This enables the starting characteristics of the motor to be considerably improved. The center point of the eccentric of the motor shaft driving the compressor piston is in the region of the neutral line of the rotor and, at most, offset by a few degrees from this neutral line.

In compressors, there is often the problem, especially in the case of the compressors working in a refrigeration plant, that a considerable pressure remains in the piston volume after the motor has been switched off and this pressure will decay only very gradually towards the suction side. If switching on occurs after a short period, this pressure cushion can hinder or completely suppress starting. A renewed starting attempt must then generally be postponed until the pressure in the piston volume has become sufficiently low.

The invention is based on the problem of providing a motor-compressor unit of the aforementioned kind in which the starting difficulties associated with the pressure in the piston volume can be reduced. This problem is solved according to the invention in that provision is made for offsetting between the center of the eccentric and the neutral line of the rotor and/or between the neutral line of the stator and the cylinder axis and that the entire angle of offset is at least 30°.

If the center point of the eccentric is located substantially in the region of the neutral line of the rotor and the neutral line of the stator coincides with the cylinder axis, the compressor will run through its top dead center and hence the zone where the highest torque is required just when the driving torque is low or even zero by reason of changing the excitable poles over. The top dead center is therefore passed mainly because of the moment of inertia of the rotating parts. In the starting phase, this moment of inertia is low because of the low rotary speed. On the other hand, if there is offsetting in accordance with the invention, the region of the top dead center is in a zone in which the motor develops its full torque. The moment of inertia is immaterial as far as passing the top dead center is concerned. Consequently, starting is even possible when the pressure in the piston volume has not decayed or has not decayed as far as was hitherto necessary. Also, it is possible to load the compressor during operation more than has hitherto been the case.

The simplest solution is obtained if the neutral line of the stator substantially coincides with the cylinder axis and the offsetting is brought about solely through the application of the eccentric to the motor shaft. This takes up the least possible space.

An angle of offset of 45° to 135° has been found particularly suitable. This ensures that the entire range in which the higher driving torque is required lies outside the change-over zone.

If, by reason of the magnetic field distribution between the rotor and stator, the rotor has at least one defined rest position near the neutral position, it is advisable for the angle of offset to be selected so that the compressor piston has a rest position in which an increase in the piston space leads to an increase in the smaller of the two angles between the neutral line of the rotor and that of the stator. With this construction, the pressure in the piston volume assists starting of the motor. In the simplest case, there will be an increase in angle in the operative direction of rotation so that the piston volume pressure assists the motor driving torque. Very often, a particular magnetic field distribution between the rotor and stator results in two defined rest positions. In this case it is necessary to have a motor-compressor unit in which these two rest positions are offset from each other by less than 180° and in which the control circuit gives the excitable poles a predetermined polarity for a predetermined over-control period in the first part of the starting phase independently of the rotary position of the rotor, so that the rotor will initially start against the operative direction of rotation, namely out of the first rest position through a smaller angle towards the adjacent neutral position and out of the second rest position through a larger angle. The angle of offset should here be selected so that the piston volume enlargement occurs in the second part of the starting phase when starting out of the first rest position and in the first part of the starting phase when starting out of the second rest position. When starting out of the first rest position, the piston volume is reduced as far as the pressure in the piston volume will permit; subsequently, acceleration will occur in the operative direction of rotation with the additional support of the piston volume pressure. When starting out of the second rest position, however, reverse rotation under the influence of the piston space pressure is prolonged. During the subsequent forwards rotation, a large angle will be available up to reaching the change-over point and the rotor will develop such a large moment of inertia that the driven parts of the unit are moved beyond the change-over zone.

In a preferred construction in which the rotor carries the permanent magnetic poles and a stationary permanently magnetic pole is disposed between the stator poles to fix the two defined rest positions, it is recommended that the center point of the eccentric be located on the side of the permanently magnetic pole of the rotor that does not correspond to the stationary permanently magnetic pole. The construction of such a motor will correspond to U.S. Pat. No. 4,251,758. The position of the center point of the eccentric will give the desired starting characteristics.

It has been found favorable for the center point of the eccentric to precede the neutral line of the rotor in the operative direction of rotation by 60° to 120°, preferably about 90°. In this position of the center point of the eccentric, there will be reliable starting out of both rest positions. In addition, tolerances will not be important when applying the eccentric to the motor shaft.

A preferred example of the invention will now described in more detail with reference to the drawing, wherein:

FIG. 1 is a diagrammatic representation of a motor-compressor unit according to the invention in the first rest position;

FIG. 2 shows the FIG. 1 unit in the second rest position;

FIG. 3 is a diagrammatic circuit diagram of the motor and its control;

FIG. 4 shows the drive torque against the rotary position of the rotor;

FIG. 5 shows the holding torque against the rotary position of the rotor; and

Figure 6:
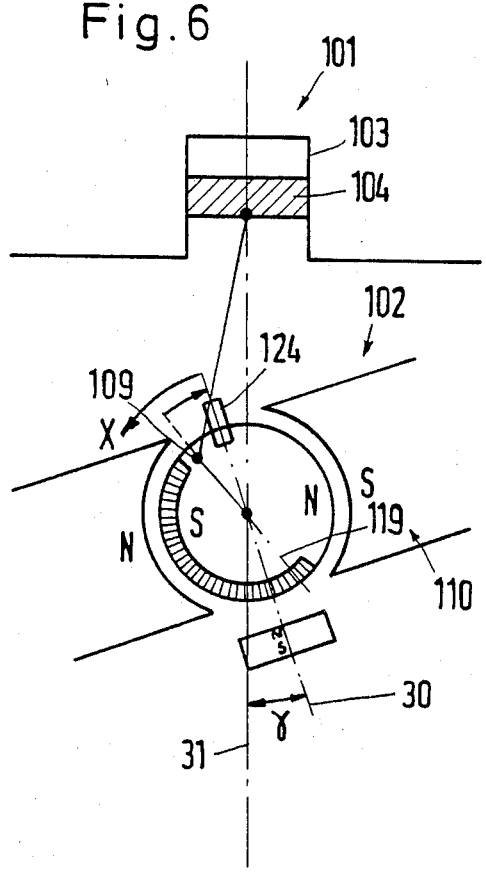
FIG. 6 illustrates a modified embodiment.

The motor-compressor unit of FIGS. 1 to 3 comprises a piston compressor 1 and a DC motor 2. The compressor has a cylinder 3 and a piston 4, thereby forming a piston volume 5 which is connected by way of an inlet valve to a suction conduit and by way of an outlet valve to a pressure conduit in a manner which is conventional and not shown in more detail. In particular, the compressor is one for use in a refrigeration plant. The piston 4 is driven by a motor shaft 6 by way of a crank 7 and a connecting rod 8. The axis of the connecting rod bearing between the crank 7 and connecting rod 8 forms the center point 9 of an eccentric which turns with the motor shaft 6.

The motor 2 comprises a stator 10 with two poles 11 and 12 each provided with an exciter coil 13 and 14. The stator therefore has a neutral line 15 in the same direction as the cylinder axis. A rotor 16 comprises two permanently magnetic poles 17 and 18, namely a south pole S and a north pole N. Accordingly, the rotor 16 has a neutral line 19.

Both exciter coils 13 and 14 are applied by their one end to a direct current voltage $U_B$ and are connected by their other ends to the zero point 0, each by way of an electronic switching element 20 and 21. The switching elements may be transistors, thyristors, or the like. A control circuit 22 ensures that the switching element 20 and the switching element 21 become conductive alternately, namely depending on the rotary position of the rotor 16. For this purpose, the rotor has an arcuate cover 23 which extends through 180° and is scanned by a stationary sensor 24 electrically, magnetically, optically or in some other manner. The cover 23 is offset relatively to the neutral line 19 of the rotor 16 so that a change in the sensor signal will in each case take place just before reaching the neutral position in which the neutral lines 15 and 19 of the stator and rotor coincide. Sensing of the cover has the advantage that a definite signal will be given in every desired position of the rotor, even when it is standing still.

Between the two stator poles 11 and 12 there is a starting magnet 25 with a stationary permanent magnetic pole, in this case N. It acts on the permanent magnet south pole S of the rotor in such a way that one obtains the two defined rest positions for the stator 16 as shown in FIGS. 1 and 2. In the first rest position of FIG. 1, a small angle α is obtained between the neutral line 15 of the stator and the neutral line 19 of the rotor and in the second rest position of FIG. 2, one obtains a considerably larger angle β which is approximately (180−α). The angle α may for example be from 5° to 15°.

The control circuit 22 is so constructed that, during the first part of the starting phase and independently of the rotary position of the rotor 16, it gives the excitable poles 11 and 12 a predetermined polarity during a predetermined over-control period. For details of this control, attention is drawn to U.S. Pat. No. 4,251,758. The two rest positions and the predetermined polarity are so associated that the rotor 16 initially starts against the operative direction of rotation X, i.e. in the direction of rotation Y. For the first rest position, this reverse rotation Y terminates no later than the angle α, because the neutral position has then been reached. In the case of the second rest position, the rotor can traverse a larger angle in the counter-direction Y.

The center point 9 of the eccentric is offset by an angle γ from the neutral line 19. The angle of offset should amount to at least 30°. It will generally be between 45° and 135°. The angular range of 60° to 120° is preferred. The best will be about 90° as is shown in the drawing. By reason of this offset, one obtains the following two advantages:

1. As is diagrammatically shown in FIG. 4, the driving torque $M_A$ of the motor 2 has interruptions or gaps 26 at spacings of 180°. The reason for this is that, on changing the exciter current over, the magnetic field must be reduced and then built up again, which requires a certain amount of time. These gaps 26 are substantially in the region of the neutral position at which the neutral lines 15 and 19 of the stator and rotor coincide. In the absence of the drive torque $M_A$ in the region of the gap, the compressor must during this time be driven by the moment of inertia of the rotating parts. To operate the compressor 1, a torque $M_V$ is required which, in the region of the top dead center has a maximum 27 which is repeated once during each period p. This maximum 27 is offset from the gap 26 by the angle γ. Consequently, the full motor driving torque $M_A$ is available in the region of the top dead center. The compressor is thereof taken through top dead center at a substantially higher torque than if the maximum 27 were in the region of the gap 26 as hitherto. This facilitates starting even in the case of counter-pressure in the piston space 5. In addition, one can load the compressor more than hitherto during operation.

2. When starting out of the two rest positions, the piston space pressure contributes towards better starting. If one starts out of the first rest position in FIG. 1, there will be reverse rotation through a small angle under the influence of the starting over-control. If, after lapse of the over-control period, normal operation then sets in, the rotor 16 is driven not only by the motor 2 but also by the pressure in the piston space 5. During the first 180° of its rotation, it has such a large rotary speed imparted to it that it will turn without difficulty through the gap 26 in the driving torque $M_A$. When starting out of the second rest position in FIG. 2, the reverse rotation in the direction Y is assisted by the pressure in the piston space 5. Reverse rotation will therefore take place through a larger angle than was the case hitherto. If normal operation then sets in, the rotor will again be sure to have an adequate rotary speed as it traverses the gap 26. In addition, until reaching the maximum 27 of the compressor torque $M_V$, the rotor will have reached such a high speed that the driving torque $M_A$ is supported by the moment of inertia of the rotor. Since the piston space pressure is relieved in both cases before the top dead center is passed for the first time, proper starting will occur even if the piston space pressure is still high.

FIG. 5 shows the holding torque $M_H$ of the unexcited motor 2. The increase 28 and the shallower inclination of the flank 29 arise out of the influence of the starting magnets 25. The two defined rest positions are designated I and II. The rotations X and Y correspond to those in FIGS. 1 and 2.

In the FIG. 6 embodiment, corresponding integers are provided with reference numerals increased by 100 relatively to FIGS. 1 to 3. In this case, the neutral line 30 of the stator 110 is offset from the cylinder axis 31 by the angle of offset $\gamma$. The center point 109 of the eccentric is disposed in the neutral line 119 of the rotor. It will be seen that here the maximum 27 of the compressor torque $M_V$ is again offset from the region of the gap 26 and that there will be the same easier starting as already explained in conjunction with FIGS. 1 to 3.

The entire angle of offset $\gamma$ can also be achieved through the summation of an offset between the center point of the eccentric and the neutral line of the rotor and an offset between the neutral line of the stator and the cylinder axis.

I claim:

1. A motor-compressor unit, comprising, a piston-cylinder unit including a piston and a cylinder with a piston space therebetween and having a compressor center line, a two pole DC rotor-stator unit comprising a rotor and a stator of which one has permanent magnetic poles and the other has excitable poles, said rotor and stator having neutral lines with said neutral line of said stator forming a first angle with said compressor center line, control circuit means for changing the polarities of said excitable poles in response to the angular position of said rotor, a shaft for said rotor having an eccentric for driving said piston forming a second angle with said neutral line of said rotor, and means for providing said first and second angles so that the sum thereof is on the order of thirty degrees as an aid to the starting operation thereof.

2. A unit according to claim 1 wherein said neutral line of said stator substantially coincides with said center line of said compressor so that said sum of said first and second angles is attributable solely to said second angle.

3. A unit according to claim 1 wherein the sum of said angles is from 45° to 135°.

4. A unit according to claim 1 wherein said rotor has at least one defined rest position by reason of the magnetic field distribution between said rotor and said stator wherein said sum of said angles is selected so that said compressor unit piston has a rest position in which an increase in said piston space leads to an increase in the angles between said neutral line of the said rotor and said neutral line of said stator.

5. A unit according to claim 1 wherein by reason of the magnetic field distribution between said rotor and said stator said rotor has two defined rest positions which are offset from each other by less than 180°, said control circuit in the first part of the starting phase gives said excitable poles a predetermined polarity for a predetermined period indpendently of the rotory positions of said rotor so that said rotor initially starts up in the opposite direction to that during operation namely out of the first rest position through a smaller angle in a direction towards the adjacent neutral position and out of the second rest position through a larger angle, wherein said sum of said angles is slected so that an increase in said piston space upon starting out of said first rest position occurs in the second part of the starting phase and upon starting out of said second rest position occurs in the first part of the starting phase.

* * * * *